United States Patent
Joshi et al.

(10) Patent No.: US 6,438,386 B2
(45) Date of Patent: Aug. 20, 2002

(54) IMMEDIATE CHANNEL ASSIGNMENT IN A WIRELESS SYSTEM

(75) Inventors: Chandra Joshi, Gaithersburg, MD (US); Anthony R. Noerpel, Lovettsville, VA (US); Gerard Stelzer, Frederick; Mohammad Soleimani, Rockville, both of MD (US); Prabir Datta, Delhi (IN); Xiaoping He, Germantown, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/115,095

(22) Filed: Jul. 13, 1998

Related U.S. Application Data

(60) Provisional application No. 60/052,443, filed on Jul. 14, 1997.

(51) Int. Cl.$^7$ ................................................ H04B 7/26
(52) U.S. Cl. ........................ 455/515; 455/450; 455/455
(58) Field of Search ................................. 455/450, 459, 455/458, 455, 464, 515, 434

(56) References Cited

U.S. PATENT DOCUMENTS

| | | | |
|---|---|---|---|
| 5,245,634 A | | 9/1993 | Averbuch .................... 375/108 |
| 5,307,399 A | * | 4/1994 | Dai ............................. 378/57 |

(List continued on next page.)

FOREIGN PATENT DOCUMENTS

| | | | | |
|---|---|---|---|---|
| EP | 0046831 | 3/1982 | ............. | H04L/1/18 |
| EP | 0162478 | 11/1985 | ............. | H04L/1/18 |
| EP | 0475698 | 3/1992 | ............. | H04Q/7/04 |
| EP | 0506255 | 9/1992 | ............. | H04B/7/195 |
| EP | 0637142 | 2/1995 | ............. | H04B/7/185 |
| EP | 0662758 | 7/1995 | ............. | H04B/7/185 |
| EP | 0663736 | 7/1995 | ............. | H04B/7/185 |
| EP | 0668667 | 8/1995 | ............. | H04B/7/26 |
| EP | 0748064 | 12/1996 | ............. | H04B/7/185 |
| JP | 04045617 | 2/1992 | ............. | H04B/1/38 |
| WO | 8607512 | 12/1986 | ............. | H04B/7/185 |
| WO | 9102436 | 2/1991 | ............. | H04Q/7/04 |
| WO | 9612352 | 4/1996 | ............. | H04B/1/40 |
| WO | 9718650 | 5/1997 | ............. | H04L/1/08 |
| WO | 9723065 | 6/1997 | ............. | H04B/7/185 |
| WO | 9724891 | 7/1997 | ............. | H04Q/7/22 |
| WO | 9839857 | 9/1998 | ............. | H04B/7/185 |

OTHER PUBLICATIONS

US 5,415,368, 05/1995, Horstein et al. (withdrawn)

Garg, et al., "Cost Effective Personal Communications Using Geo–Synchronous Satellite", 1996 IEEE International Conference on Personal Wireless Communications Proceedings and Exhibition—Future Access (CAT. No. 96TH8165), 1996.

Fingerle et al., "GSM Signalisierung in der Praxis", ITG–Fachbericht, pp. 423–432, No. 124, Sep. 1993

Annoni et al., "Access and Synchronization Schemes in the ESA OBP System", Countdown to the New Milennium, Phoenix, pp. 206–211, Dec. 2, 1991, IEEE.

*Primary Examiner*—Daniel Hunter
*Assistant Examiner*—Nick Corsaro
(74) *Attorney, Agent, or Firm*—John T. Whelan; Michael W. Sales

(57) ABSTRACT

An approach for immediate channel assignment in a wireless communications system involves receiving a channel request message from a wireless transceiver, the channel request message including a dialed party number; forming an immediate assignment message including a channel assignment; transmitting the immediate assignment message to the wireless transceiver; and establishing a communications channel between the wireless transceiver and a called party by establishing a channel between the wireless transceiver and the called party.

4 Claims, 4 Drawing Sheets

U.S. PATENT DOCUMENTS

| | | | | |
|---|---|---|---|---|
| 5,343,512 A | * | 8/1994 | Wang | 379/59 |
| 5,502,725 A | * | 3/1996 | Pohjakallio | 370/94.1 |
| 5,551,058 A | | 8/1996 | Hutcheson et al. | 455/33.2 |
| 5,589,837 A | | 12/1996 | Soleimani et al. | 342/359 |
| 5,630,016 A | | 5/1997 | Swaminathan et al. | 395/2.37 |
| 5,678,228 A | | 10/1997 | Soeimani et al. | 455/343 |
| 5,689,568 A | | 11/1997 | Laborde | 380/49 |
| 5,701,298 A | * | 12/1997 | Diachina | 370/346 |
| 5,706,329 A | * | 1/1998 | Foladare | 379/57 |
| 5,710,982 A | | 1/1998 | Laborde et al. | 455/69 |
| 5,717,686 A | | 2/1998 | Schiavoni | 370/321 |
| 5,745,524 A | | 4/1998 | Hull | 375/244 |
| 5,758,256 A | | 5/1998 | Berry et al. | 455/72 |
| 5,765,098 A | | 6/1998 | Bella | 455/13.3 |
| 5,781,540 A | | 7/1998 | Malcolm et al. | 370/321 |
| 5,790,939 A | | 8/1998 | Malcolm et al. | 455/13.2 |
| 5,794,160 A | | 8/1998 | Eauriko | 455/557 |
| 5,812,545 A | | 9/1998 | Liebowitz et al. | 370/337 |
| 5,881,101 A | | 3/1999 | Furman et al. | 375/217 |
| 5,920,284 A | | 7/1999 | Victor | 342/357.01 |
| 5,926,469 A | * | 7/1999 | Norstedt | 370/329 |
| 5,926,764 A | * | 7/1999 | Sarpola | 455/450 |
| 5,940,753 A | | 8/1999 | Mallinckrodt | 455/422 |
| 5,940,763 A | * | 8/1999 | Alperovich | 455/450 |
| 5,943,606 A | | 8/1999 | Kremm et al. | 455/12.1 |
| 5,956,646 A | * | 9/1999 | Kolev | 455/502 |
| 5,966,662 A | * | 10/1999 | Murto | 455/458 |
| 5,987,319 A | * | 11/1999 | Hermansson | 455/422 |
| 5,991,642 A | * | 11/1999 | Watanabe | 455/460 |
| 6,046,990 A | * | 4/2000 | Chennakeshu | 370/317 |
| 6,119,000 A | * | 5/2000 | Stephenson | 455/432 |
| 6,138,028 A | * | 10/2000 | Thoma | 455/466 |

* cited by examiner

IMMEDIATE CHANNEL ASSIGNMENT IN A WIRELESS SYSTEM

This application claims priority to U.S. Provisional patent application Serial No. 60/052,443, of Dave Roos, et al.; filed Jul. 14, 1997, for, incorporated herein by reference.

This patent document relates to a common air interface described in a series of patent documents filed concurrently herewith. Related patent documents are: U.S. patent application Ser. No. 09/115,102, filed Jul. 13, 1998, of Soleimani, et al.; for SIGNALING MAINTENANCE FOR DISCONTINUOUS INFORMATION COMMUNICATIONS, U.S. patent application Ser. No. 09/115,098, filed Jul. 13, 1998, of Joshi, et al.; for SYSTEM AND METHOD FOR IMPLEMENTING TERMINAL TO TERMINAL CONNECTIONS VIA A GEOSYCHRONOUS EARTH ORBIT SATELLITE, U.S. patent application Ser. No. 09/115,097, filed Jul. 13, 1998, of Roos, et al.; for MOBILE SATELLITE SYSTEM HAVING AN IMPROVED SIGNALING CHANNEL, U.S. patent application Ser. No. 09/115,096, filed Jul. 13, 1998, of Noerpel, et al.; for SPOT BEAM SELECTION IN A MOBILE SATELLITE COMMUNICATION SYSTEM, U.S. patent application Ser. No. 09/115,101, filed Jul. 13, 1998, of Noerpel, et al.; for PAGING RECEPTION ASSURANCE IN A MULTIPLY REGISTERED WIRELESS TRANSCEIVER, U.S. patent application Ser. No. 09/115,044, filed Jul. 13, 1998, of Joshi, et al.; for ERROR AND FLOW CONTROL IN A SATELLITE COMMUNICATIONS SYSTEM, and U.S. patent application Ser. No. 09/115,100, filed Jul. 13, 1998, of Roos, et al.; for SYNCHRONIZATION OF A MOBILE SATELLITE SYSTEM WITH SATELLITE SWITCHING, all of which are incorporated herein by reference.

BACKGROUND OF THE INVENTION

The present invention relates to channel assignment in a wireless communications system, and more particularly to immediate channel assignment in a wireless communications system. Even more particularly, the present invention relates to channel assignment, or connection resolution and gateway assignment at an early time in a signalling phase of a wireless call.

Wireless communications have increased mobility, reachability and efficiency in modern society. Most wireless communications systems are land based systems known as cellular telephony systems. Cellular telephony systems are based on terrestrial base stations that together form a network of cells within which communications between subscriber units and the base stations are conducted.

In remote locations, however, or in locations in which a particular subscriber unit or wireless transceiver is not authorized to communicate, a wireless transceiver can have little or no value to its user.

One solution to the geographic limitations imposed by terrestrial cellular systems is the satellite based system. In these systems, a few satellites cover wide areas of the globe with wireless transceivers operating anywhere within these areas communicating directly with the corresponding satellites.

In conventional wireless access communications, whether cellular, fixed wireless, personal communications services or satellite-based, a random access channel is an access window in which the wireless transceiver transmits a short channel request message of only a few bits. This message is received by a respective network and used only for contention resolution and timing synchronization. Since most wireless systems do not support optimal routing to other gateways, this protocol is satisfactory in such systems. For systems, however, like satellite systems, with optimal routing, implementing this approach results in a call setup time penalty of more than, for example, five seconds.

SUMMARY OF THE INVENTION

The present invention advantageously addresses the needs above as well as other needs by providing an approach to immediate channel assignment in a wireless communication system.

In one embodiment, the present invention can be characterized as a method for immediate channel assignment in a wireless communications system. The method has steps of receiving a channel request message from a wireless transceiver, the channel request message including a dialed party number; forming an immediate assignment message including a channel assignment; transmitting the immediate assignment message to the wireless transceiver; and establishing a communications channel between the wireless transceiver and a called party by establishing a channel between the wireless transceiver and the called party.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
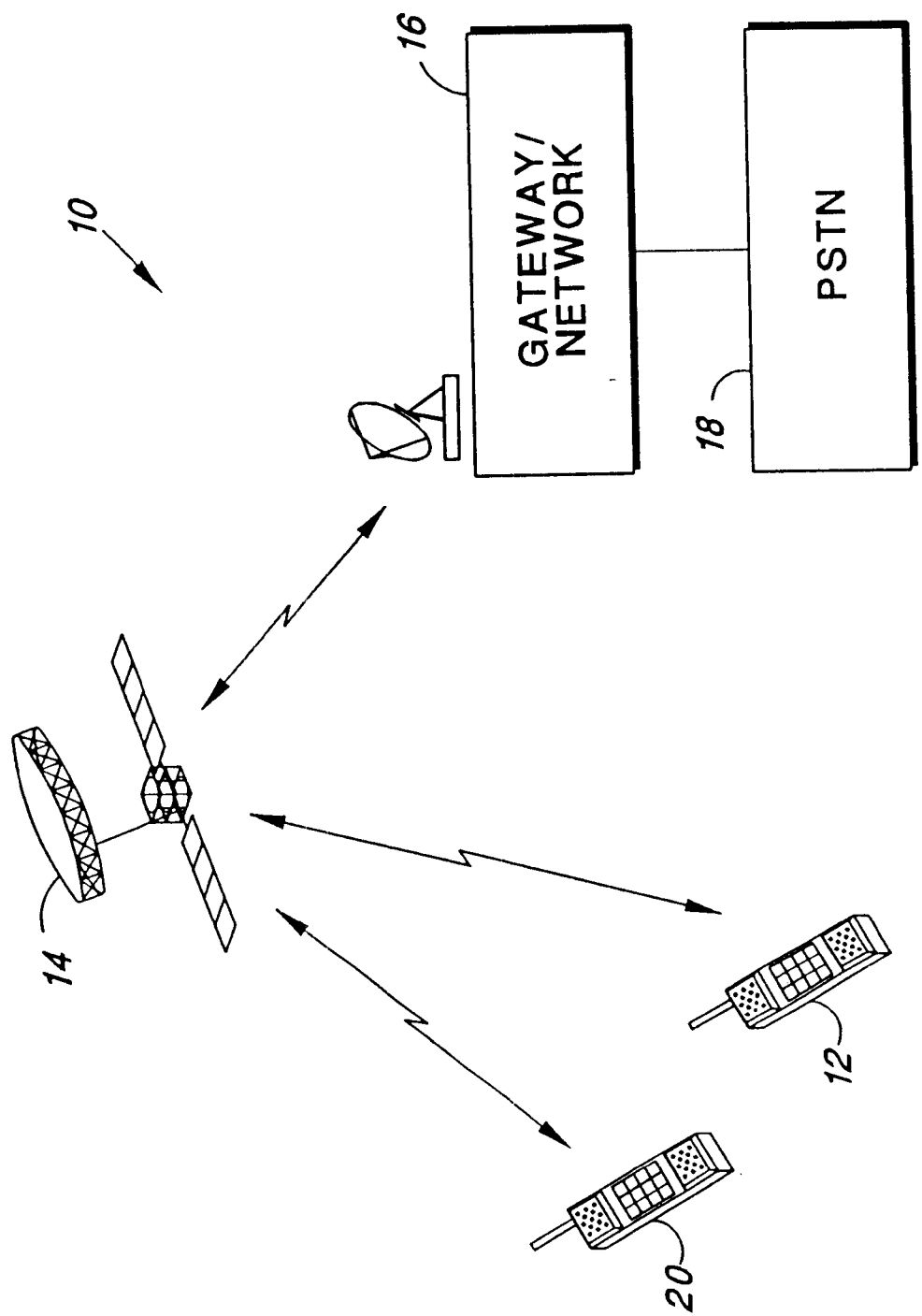
FIG. 1 is schematic diagram illustrating a satellite system with which teachings of the present invention can be employed.

Referring first to FIG. 1, a block diagram is shown of a satellite system 10 comprising a wireless transceiver 12, a satellite link 14, a gateway/network 16 and a public switched telephone network 18 (PSTN).

In order to perform optimal routing for mobile originated calls in the satellite system, as early as possible in a call signalling flow, a channel request message, transmitted in a random access channel (RACH), may contain, as an example, up to 15 dialed digits of a called party's telephone number. These 15 dialed digits are used by the gateway/network to connect through the public switched telephone network 18 to the called parties location. Thus, the channel request message transmitted in the random access control channel contains enough information to route a call from the wireless transceiver 12 through the gateway/network 16 into the public switched telephone network 18, by assigning the wireless transceiver to an appropriate call channel immediately upon receipt of the channel request message in the random access control channel.

This approach represents a novel use of the random access control channel, which is normally used only for contention resolution.

Two additional aspects of the present embodiment include adaptation of a new timer, referred to herein as a pause timer, which is employed in a channel assignment process; and an extended immediate assignment protocol for those cases in which a called parties number consists of more than 15 digits, or whatever number has been defined in the channel request message format for the communications system within which the teachings of the present embodiment are employed.

To further expand on the above discussion, the channel request message is transmitted within the random access control channel, as with prior art systems, however, in accordance with prior art systems, this message is normally a very short burst containing a larger than normal synch word and about eight bits of a random code. The larger synch word helps the network synchronize and demodulate the burst, while the eight random bits are echoed back to the wireless transceiver. The random bits are there to resolve contention in the case of two or more wireless transceivers transmitting bursts in the random access control channel simultaneously. In this way the wireless transceivers (assuming there are two or more wireless transceivers transmitting bursts in the random access control channel simultaneously) are able to determine to which wireless transceiver the immediate assignment message is directed. In accordance with the present embodiment, the gateway/network 14 also sends back an immediate assignment message assigning the wireless transceiver 12 to a traffic channel. Furthermore, the gateway/network 16 measures the difference in time between actual receipt of the channel request message and a targeted time in which the wireless transceiver 12 intended the message be received by the gateway/network 16. This time is reported back to the wireless transceiver 12 along with a channel assignment in an immediate assignment message so that the wireless transceiver 12 can connect its corrected time of transmissions so as to be synchronized with the gateway/network.

The wireless transceiver 12 executes a procedure referred to herein as a random access procedure whereby, in the case of collisions, the wireless transceiver 12 retransmits the channel request message. The wireless transceiver 12 starts a timer when it launches the channel request message, and if it does not receive a response from the gateway/network 16 before the timer expires, the wireless transceiver 12 assumes that the first transmission was not properly received by the gateway/network 16, either because of a fade or because of a collision with another wireless transceiver's 20 channel request, or for some other reason. The wireless transceiver 12 then calculates another transmission time within the random access control channel, with a random element to avoid repeated collisions and retransmits the random access message.

Ideally the retransmission timer should be short so that the channel request is not overly delayed. In conventional systems, this timer is normally only a little bit longer than a roundtrip propagation delay in the satellite system, plus some modest processing time allowance.

In accordance with the present embodiment, the gateway/network 16 also sends back an immediate assignment message assigning the wireless transceiver 12 to a traffic channel. In accordance with the present approach to the immediate assignment of channels, the channel request message, in addition to all the normal functions it is performing, i.e., contention resolution and timing correction, also transmit to the gateway/network 16 information needed by the network to route the call optimally. In accordance with the present embodiment, the gateway/network 14 also sends back an immediate assignment message assigning the wireless transceiver 12 to a traffic channel.

In the case of wireless transceiver 12 originated calls, this means that the channel request message can contain the dialed digits or the called party number. The gateway/network 16, upon receipt of this burst in the random access channel, analyzes the dialed digits and determines a best gateway through which to route the calls so that the network facilities used to connect the call are minimized.

In contrast, in a conventional approach, the wireless transceiver 12 is assigned to a channel at the current gateway, and proceeds with call establishment signalling. This entails establishing a data link layer connection, radio resource layer connection and finally a mobility management connection. During this time the wireless transceiver 12 is authenticated and cipher mode is established. The wireless transceiver 12 then transmits a setup message that contains the call party number as an information message. This information message is conveyed directly to a switch for digit analysis. It is at this point that the gateway/network recognizes that the call may need to be routed to another gateway. At least five or more seconds may have elapsed under this approach before the gateway selection process takes place. Unfortunately, if a wireless transceiver is to be reconnected to another gateway, this entire process must be repeated adding to the call setup delay.

Advantageously, the approach of the present embodiment allows the network to receive the dialed digits early and perform gateway selection before the data link layer is established and other signalling procedures take place. While this procedure greatly reduces call setup time, the digital analysis and gateway selection time take a variable amount of time, depending on the number of the called party and the contents of the channel request message. For example, the called party may be a wire line (or land line) telephone associated with the public switched telephone network 18, which is immediately connected to the gateway receiving the channel request message. In this case, the digit analysis proceeds rapidly and the immediate assignment message can be dispatched very quickly. In contrast, if the called party is another wireless transceiver, and this other wireless transceiver is roaming, the home location register (HLR) of the roaming wireless transceiver must be queried and other network signalling may need to take place in order to locate the called party before an optimal gateway can be selected and the link appropriately routed. The gateway selection time thus may vary from a few tens of milliseconds to several seconds.

Thus, a contention resolution timer must be set for a maximum time in order to avoid cases where it prematurely expires, causing the wireless transceiver 12 to transmit more random access control channel bursts unnecessarily. An affect of these unnecessary retransmissions of random access channel bursts would be to cause congestion on the random access control channel. To avoid this problem, the present embodiment employs a new channel request timer referred to herein as a pause timer. The use of the pause timer is illustrated in FIG. 2.

Figure 2:
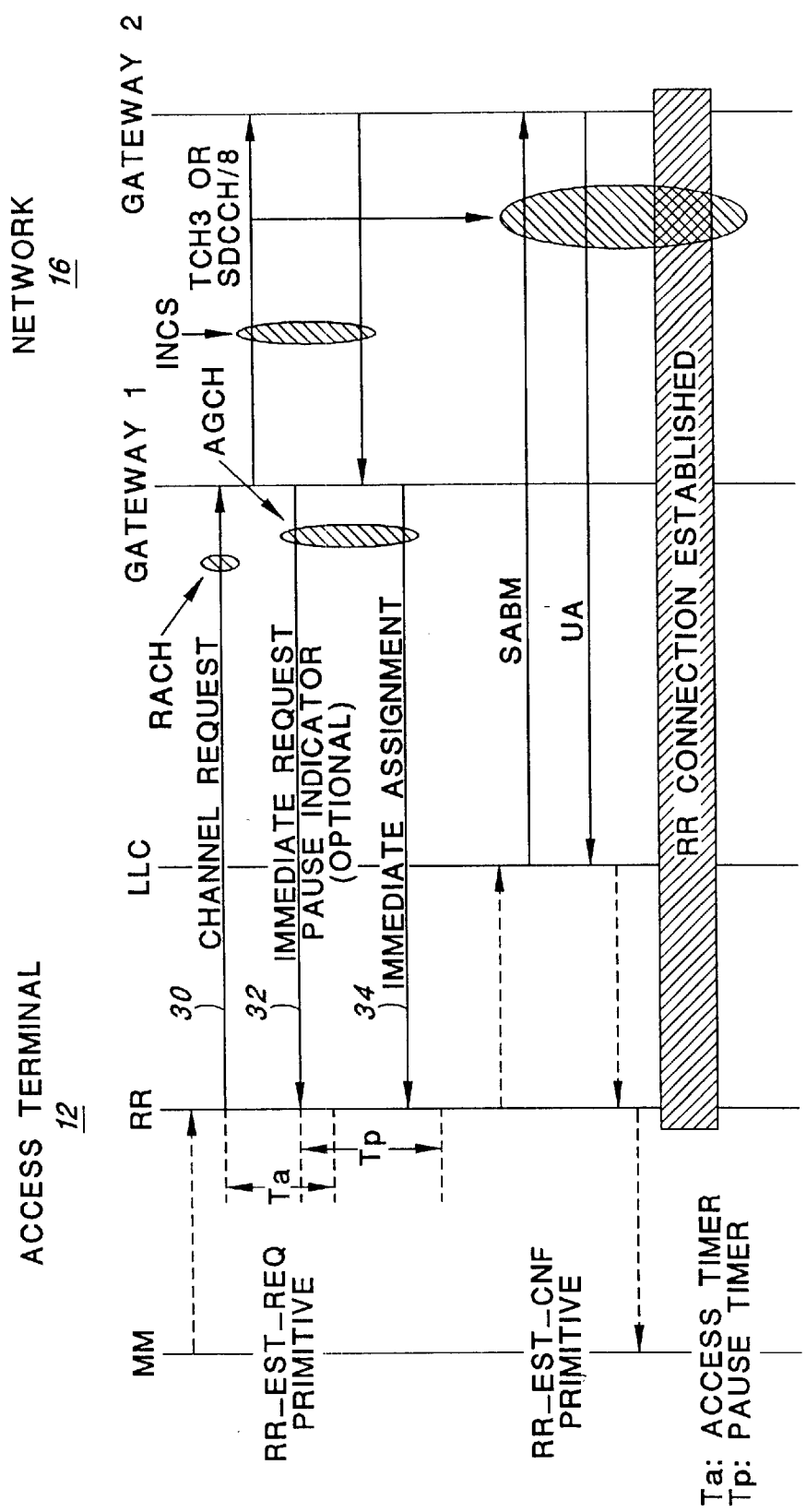
FIG. 2 is a signal diagram showing various signals sent between various hardware and software subsystems in order to effect channel assignment in the satellite system of FIG. 1.

Referring next to FIG. 2, a timing diagram is shown of message traffic between the wireless terminal 12 and the gateway/network 16 operating in accordance with one embodiment of the present invention. As shown, a channel request message 30 is sent with a called party number as discussed above.

After transmission of the channel request message 30 an access timer $T_a3$ is set. The access timer $T_a$ is a short time period allowing only for propagation delay and some modest processing time, such as in a similar timer employed in the prior art. If the gateway/network 16 can analyze the called party number rapidly because of the nature of the called party number, the gateway/network 16 transmits an immediate assignment message 32 with the channel assignment, timing connection and random access resolution well before the access timer $T_a$ expires. On the other hand, if due to the nature of the called party number, gateway selection for optimal routing cannot take place very quickly, the immediate assignment message 32 resolves the random access by correctly responding to the wireless transceiver on the Access Grant Channel (AGCH), but instead of assigning a channel or gateway, commands the wireless transceiver 12 to start a much longer pause timer $T_p$. This pause timer $T_p$ gives the gateway/network 16 more time to perform gateway selection and prevents the wireless transceiver 12 from needlessly clogging the random access control channel with unnecessary messages. A second immediate assignment message 34 is later sent with a gateway selection information.

If a wireless transceiver's access timer $T_a$ does expire before receipt of a first immediate assignment message, it is because of collision, fading or some unusual cause. The wireless transceiver 12 will initiate retransmission in this event.

Another aspect of the present embodiment is referred to herein as the extended channel request procedure. A channel request message cannot be set overly long to accommodate the number of dialed digits, because of physical constraints, for example, the limit of the satellite system may be about 15 digits. For cases where the teachings of the present embodiment apply to other satellite systems, this limit might be different, but the concepts disclosed herein are equally applicable.

In a case where the called party number is larger than the capacity of the channel request message for the satellite system to which the present embodiment is applied, the wireless transceiver 12 transmits all of the digits of the called party number that will fit into the channel request message. Because this number of digits is not all of the digits in the called party number, the gateway/network cannot be able to perform digit analysis and proper gateway selection 32. In this case, the immediate assignment message instructs the mobile to perform the extended channel request procedure as described below.

Figure 3:
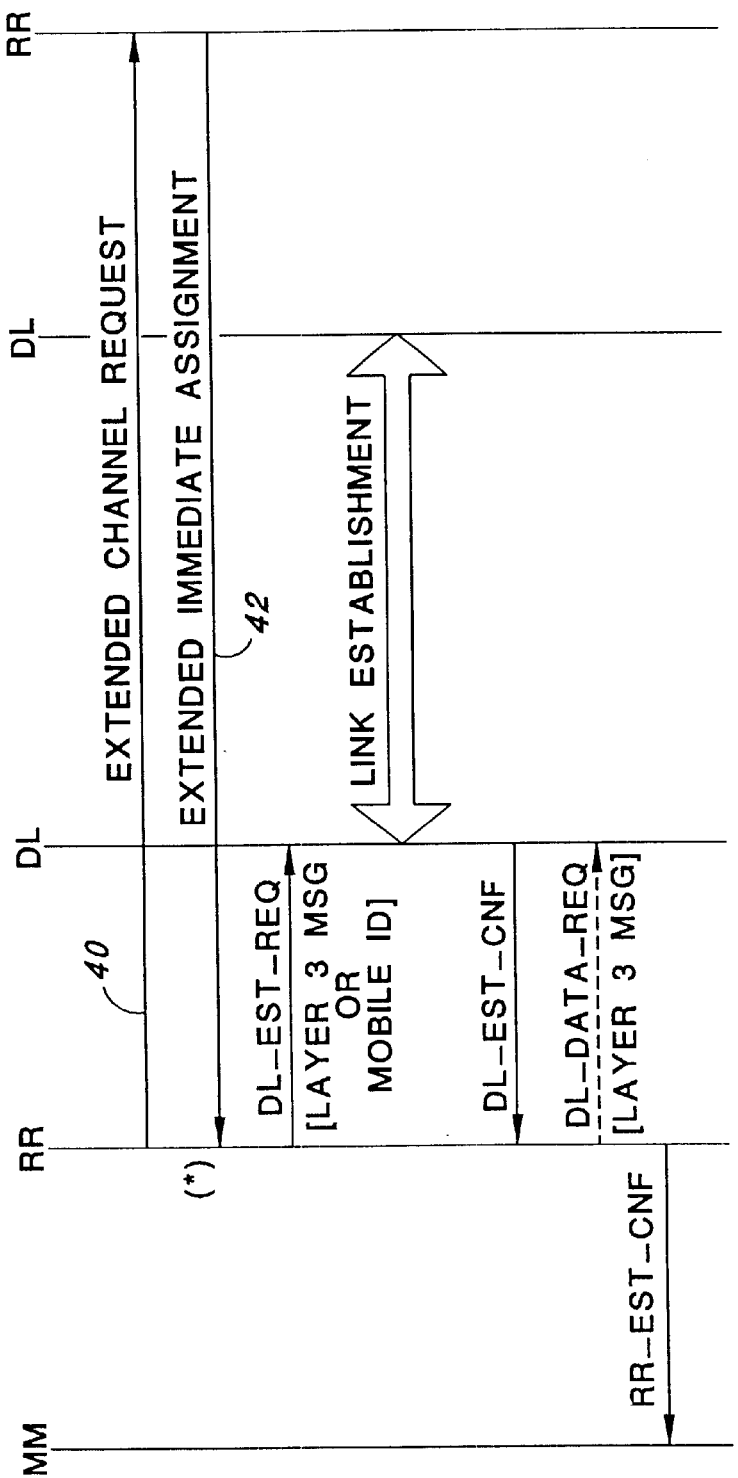
FIG. 3 is a signal diagram showing various signals sent between various hardware and software subsystems in order to effect an extended immediate assignment in the satellite system of FIG. 1.

On receipt of the immediate assignment message, with an indication to initiate extended assignment procedures, because fewer than all of the digits of the called party number were transmitted in the initial channel request message 30, and an assignment of an SSDCCH (Standalone Duplicate Control Channel) from the network, the wireless transceiver initiates the extended immediate assignment procedure as follows:

stop the access timer $T_a$;

correct timing in the wireless transceiver according to feedback received from the gateway/network in the immediate assignment message 32;

send an extended channel request message 40 (with complete information, including all the digits of the called party number) on the assigned SDDCH after establishing the multiframe transmission made or (See FIG. 3.);

start the access timer $T_a$; and start to listen on the downlink of the assigned SDCCH while waiting for response from the gateway/network 16 or expiration of the access timer $T_a$.

The gateway/network 16 in accordance with the present embodiment allocates a traffic channel to the wireless terminal 12 by sending in an extended immediate assignment message 42 in an acknowledged mode on the assigned SDCCH, (as shown in FIG. 3).

Note that the gateway/network 16 sends back the extended immediate assignment message 42 only when the information received is not sufficient, i.e., when fewer than all the digits of the called party number.

Figure 4:
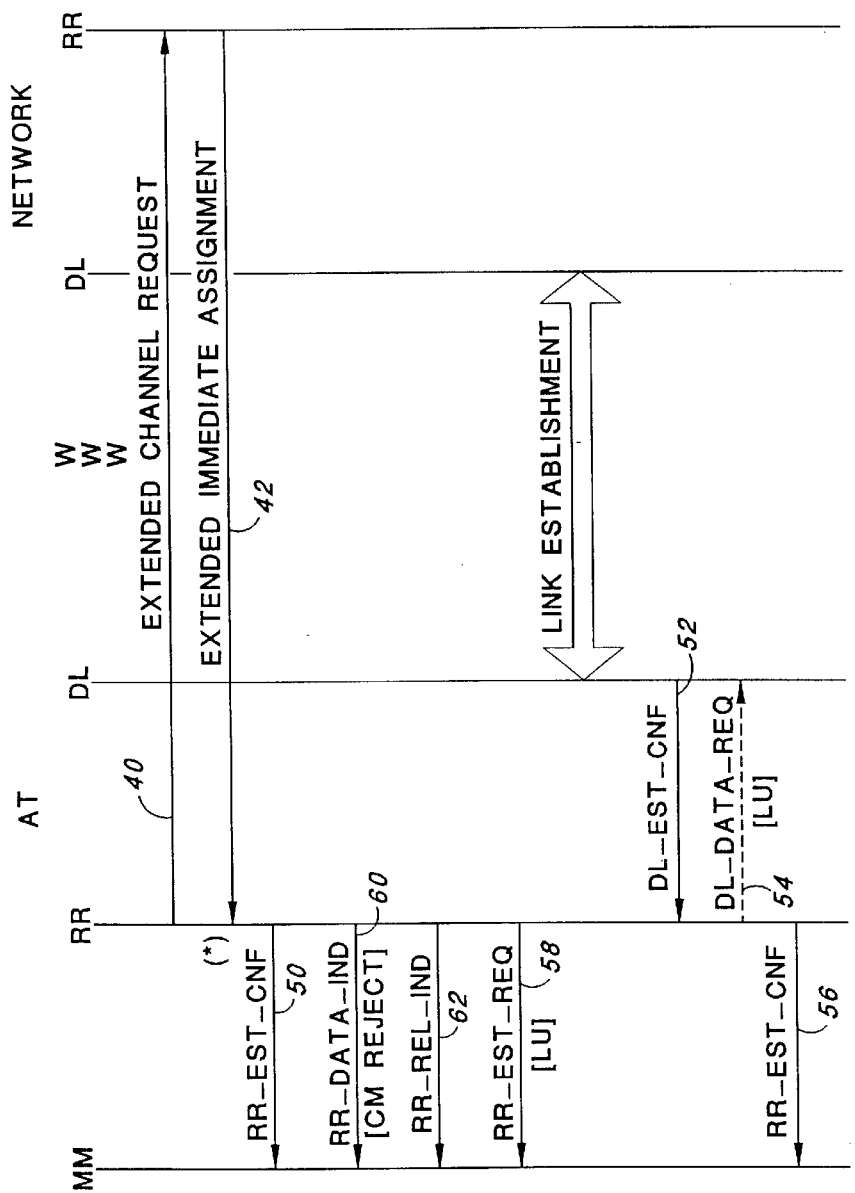
FIG. 4 is another signal diagram showing signals sent between various hardware and software subsystems in order to effect extended immediate channel assignment in the satellite system of FIG. 1.

Referring to FIG. 4, if the extended immediate assignment message contains an indication for a location update (LU) service request, then the wireless terminal shall:

stop the access timer $T_a$ if it is ever started;

activate the new assigned channel;

compare the length of a layer three message with the size of user information field of the assigned channel (the wireless terminal transfer the layer three information to the data link (DL) to initiate a link based on the channels assigned to it);

if the size of the assigned channel (user information field) is equal or greater than the size of the layer three message, the wireless terminal shall request that the DL to initiate a link establishment by issuing a DL_EST_REQ primitive with the layer three message, and on establishment of the link, the wireless terminal shall issue a RR_EST_CNF 50 primitive in response to a RR_EST_REQ to the mobility management (MM) for the establishment of the wireless terminal connection; and if the size of the assigned channel (user information field) is less than the size of the layer three message then the wireless terminal shall request the DL to initiate a link establishment procedure by issuing the DL_EST_REQ 52 primitive with only unique information such as mobile identify within it, and on establishment of the link, the wireless terminal shall transfer the layer three message to the DL with the DL_DATA_REQ 54 primitive and issue a RR_EST_CNF 56 primitive in response to a RR_EST_REQ 58 to the MM for establishment of the wireless terminal connection.

If the extended immediate assignment message 42 contains an indication of location update (LU) request, then the wireless terminal shall:

stop the access timer $T_a$;

activate the new assigned channel;

force the mobility management (MM) layer to institute a location update procedure (it sends an RR_EST_CNF primitive 50 to indicate establishment of the RR connection and indicate to the MM the identity of the AT (IMSI). If it is unknown in the visitor location register (VLR), RR (radio resource) sending release indication to mobility management, by sending the RR_DATA_

IND primitive 60 and RR_REL_IND primitive 62, and the RR_DATA_IND primitive 60 carries a CM service reject message (with a reject cause value of 4 IMSI is unknown in visitor location register), and the RR_REL_IND primitive 62 indicates normal release. Then, mobility management asks to establish RR link to perform location updating procedure.

RR receives an RR_EST_REQ primitive 58 with a layer three message (location update request);

RR compares the length of the layer three message with the size of the user information field of the assigned channel, and the wireless transceiver shall transfer the layer three information to the data link (DL) along with the type of channel assigned to it;

if the size of the assigned channel (user information) is equal or greater than the size of the layer three message, the wireless transceiver shall request the DL to initiate a link establishment procedure by issuing a DL_EST_REQ primitive 52 with a layer three message, and on establishment of link the wireless transceiver shall issue a RR_EST_CNF 56 primitive in response to the RR_EST_REQ 58 to the MM for the establishment of the wireless transceiver connection;

if the size of the assigned channel (user information) is less than the size of the layer three message, the wireless transceiver shall request the DL to initiate a link establishment procedure by issuing a DL_EST_REQ 52 primitive with only unique information such as a mobile identity, and on establishment of the link the wireless transceiver will transfer the layer three message to the DL with a DL_DATA_REQ primitive 54 and issue a RR_EST_CNF primitive 56 in response to the RR_EST_REQ 58 to the MM for the establishment of the wireless transceiver connection.

In case the gateway/network fails (access is denied, or no channel) to assign the channel, the gateway/network sends an extended immediate assignment eject message (not shown) to the wireless transceiver. On receipt of the extended immediate assignment reject message, the wireless transceiver stops the access timer.

The wireless transceiver stops sending the extended channel request messages, returns to the auto mode, and indicates to the MM layer a failure to establish a wireless transceiver connection by using a RR_REL_IND primitive in response to a RR_EST_REQ primitive 58, and starts to listen for messages broadcast, for example, in the paging channel of the broadcast control channel, by the gateway/network.

If the access timer $T_a$ expires without receiving a correct response from the gateway/network, the wireless terminal repeats transmission of the extended channel request message.

The wireless terminal maintains a count of the total number of transmission steps made during execution of the extended immediate assignment procedure (retries). When the value of a retry counter exceeds a counter broadcast over the broadcast control channel, the wireless transceiver reports failure to establish a link to a layer 3 by sending an RR_DL_IND primitive and returns to idle mode.

| EXTENDED CHANNEL REQUEST | | | | |
|---|---|---|---|---|
| Information Element | Format Type | Presence | Length | Reference |
| Protocol Discriminator | V | M | ½ | |
| Skip Indicator | V | M | ½ | |
| Message Type | V | M | 1 | |
| Type of Number | V | M | ½ | |
| Numbering Plan ID | V | M | ½ | |
| Priority | V | M | ½ | |
| Service Provider ID | V | M | 2½ | |
| Re-Try Counter | V | M | ½ | |
| Number Digits | LV | M | 12 | |
| AT Power Class | V | M | ½ | |
| Rest Octect | V | M | 5 | |

| Information Element | Format Type | Presence | Length | Reference |
|---|---|---|---|---|
| Protocol Discriminator | V | M | ½ | |
| Skip Indicator | V | M | ½ | |
| Message Type | V | M | 1 | |
| AT Info Flag | V | M | 1 | |
| Channel Description | V | M | 4 | |
| Timing Correction | V | M | 2 | |
| Power Correction | V | M | 1 | |
| Frequency Correction | V | M | 1 | |
| Rest Octect | V | M | 13 | |
| EXTENDED IMMEDIATE ASSIGNMENT REJECT | | | | |
| Protocol Discriminator | V | M | ½ | |
| Skip Indicator | V | M | ½ | |
| Message Type | V | M | 1 | |
| Cause | V | M | 1 | |
| Rest Octect | V | M | 21 | |

In accordance with the present embodiment, several variations of the above procedures are available. ATCH/3 may be sent back to the AT on an immediate assignment. TCH/3 is used to send in the extended channel request by the AT. This would normally be sent over two or three segments, since the segment size for TCH/3 is at most 7 bytes. The benefit of this approach is that a deallocation message is not required for the TCH/3 given on the immediate assignment since it can be used for non-signalling traffic.

SDCCH/4 represent four users that share one physical channel (same carrier with same time slot allocation) and may be sent back to the AT on the immediate assignment. In this case a SDCCH (standalone dedicated control channel) is used to send the extended channel request by the AT. The advantage of this approach is that this will most likely not be sent over just one segment, since segment size of SDCCH/4 is about 28 bytes, in accordance with the embodiment described herein. However, ATCH/3 is most likely sent back in the extended immediate assignment since all network operation (e.g., the gateway selection) was performed. This is similar to the regular immediate assignment described above.

One solution is to let the GSS retain information on the DCCH (dedicated control channel), and when the GSS receives confirmation that the TCH/3 is being used, it sends a deallocate SDCCH message through the TCH. In the GSS, this event is triggered by receiving a CM service request message from the AT.

Another solution is the GSS to keep a timer, such that when the timer expires the SDCCH is deallocated.

The preferred solution is the GSS to keep a timer for deallocation of the SDCCH, because it is simple to implement (GSS already implements a timer, no changes are required to the TCS), it eliminates indirection of new message, and works well for optimal routing (no gateways involved in a call setup).

The entire procedure can be simplified by sending the additional information and channel request message with a larger size random access channel burst. This burst requires only a change of the physic level and avoids all complexities.

Except in the TT call immediate assignment procedure, the AT(O) sends channel requests on the random access control channel with the called party number, and waits for the immediate assignment on the access grant channel (AGCH) of the corresponding, control channel (CCCH).

On the gateway/network site, on receipt of the channel request message, the TCS(O) determines whether or not the called party number is a satellite transceiver or cellular number or a public switch telephone network number by analyzing the received called party number. In case the called party number is either a satellite system number or a cellular system number, the TCS(O) sends an immediate assignment message with a pause indication to AT(O). The TCS(O) interrogates the called party HLR (satellite gateway/network HLR) to determine the current location of the called AT(T), i.e., the MSC IT of the AT(T).

The TCS(O) validates and assigns resources to the GSC (OL). The GSC(OL) activates the resources and acknowledges the TCS(O). The TCS(O), on receipt of acknowledgement of the resources, computes timing, frequency, and power correction for the AT(O) and assigns the allocated traffic channel to the AT(O) by sending the immediate assignment (pause=false) the corresponding common control channel with an indication of a CM service request procedure. The GSC(OL) gets a spare TCH and a reserve TTCH channel and uses them at the time of single hop connection. At the GS(O), the TCS(O) assigns the resources and transfers the "call reference ID" to the select GSC(OL) to identify the originating side of the TtT call. The AT(O), on receipt of the immediate assignment (pause=false) message activates the assigned channel and indicates a link establishment procedure on the assigned (TCH) channel. In this procedure, the AT(O) sends a set of asynchronous balance mode (SABM) message, and the GSC(OL) sends an unnumbered acknowledgement (UA) message in response to the SABM message. Successful completion of the link establishment, the wireless terminal connection is known to be established between the AT(O) and the GS(O).

While the invention herein disclosed has been described by means of specific embodiments and applications thereof, numerous modifications and variations could be made thereto by those skilled in the art without departing from the scope of the invention set forth in the claims.

What is claimed is:

1. A method for immediate channel assignment in a wireless communications system comprising:
   receiving a channel request message over a contention channel from a wireless transceiver at a gateway, wherein the channel request message includes at least a portion of a called party number, wherein the receiving occurs prior to the establishment of a signaling channel for the wireless transceiver;
   forming an immediate assignment message including a channel assignment;
   transmitting the immediate assignment message to the wireless transceiver prior to the establishment of a signaling channel for the wireless transceiver;
   establishing the signaling channel for the wireless transceiver;
   determining whether said at least a portion is a complete called party number;
   transmitting to the wireless transceiver an immediate assignment message with an indication to initiate extended assignment procedures; and
   receiving from the wireless transceiver an extended channel request message comprising a complete called party number.

2. A system for immediate channel assignment comprising:
   a wireless communications system comprising:
      a gateway receiving a channel request message over a contention channel from a wireless transceiver, the channel request message including at least a portion of a called party number and wherein the receiving occurs prior to the establishment of a signaling channel for the wireless transceiver, forming an immediate assignment message including a channel assignment, transmitting the immediate assignment message to the wireless transceiver prior to the establishment of a signaling channel for the wireless transceiver, and establishing the signaling channel for the wireless transceiver;
      the wireless transceiver transmitting to the gateway, the channel request message including the called party number, and receiving the immediate assignment message from the gateway; and a satellite link passing communications between the gateway and the wireless transceiver through a satellite,
      wherein said gateway includes:
         means for determining whether said at least a portion is a complete called party number;
         means for transmitting to the wireless transceiver an immediate assignment message with an indication to initiate extended assignment procedures; and
         means for receiving from the wireless transceiver an extended channel request message comprising a complete called party number.

3. A method for immediate channel assignment in a wireless communications system comprising:
   receiving a channel request message over a contention channel from a wireless transceiver at a gateway, wherein the channel request message includes at least a portion of a called party number, wherein the receiving occurs prior to the establishment of a signaling channel for the wireless transceiver;
   forming an immediate assignment message including a channel assignment;
   transmitting the immediate assignment message to the wireless transceiver;

establishing the signaling channel for the wireless transceiver;

determining whether said at least a portion is a complete called party number;

transmitting to the wireless transceiver an immediate assignment message with an indication to initiate extended assignment procedures; and receiving from the wireless transceiver an extended channel request message comprising a complete called party number.

4. A system for immediate channel assignment comprising:

a wireless communications system comprising:

a gateway receiving a channel request message over a contention channel from a wireless transceiver, the channel request message including at least a portion of a called party number and wherein the receiving occurs prior to the establishment of a signaling channel for the wireless transceiver, forming an immediate assignment message including a channel assignment, transmitting the immediate assignment message to the wireless transceiver, and establishing the signaling channel for the wireless transceiver;

the wireless transceiver transmitting to the gateway, the channel request message including the called party number, and receiving the immediate assignment message from the gateway; and a satellite link passing communications between the gateway and the wireless transceiver through a satellite;

wherein said gateway includes:

means for determining whether said at least a portion is a complete called party number;

means for transmitting to the wireless transceiver an immediate assignment message with an indication to initiate extended assignment procedures; and means for receiving from the wireless transceiver an extended channel request message comprising a complete called party number.

* * * * *